Dec. 22, 1959 E. M. RECTOR ET AL 2,918,587
CLOCK-PULSE INSERTION CIRCUIT
Filed April 2, 1956

EUGENE M. RECTOR,
GLENN J. WILCOX,
INVENTORS
BY
ATTORNEY

United States Patent Office 2,918,587

Patented Dec. 22, 1959

2,918,587

CLOCK-PULSE INSERTION CIRCUIT

Eugene M. Rector and Glenn J. Wilcox, Los Angeles, Calif., assignors to Hughes Aircraft Company, Culver City, Calif., a corporation of California Application April 2, 1956, Serial No. 575,545

3 Claims. (Cl. 307—88.5)

Figures 1, 2:
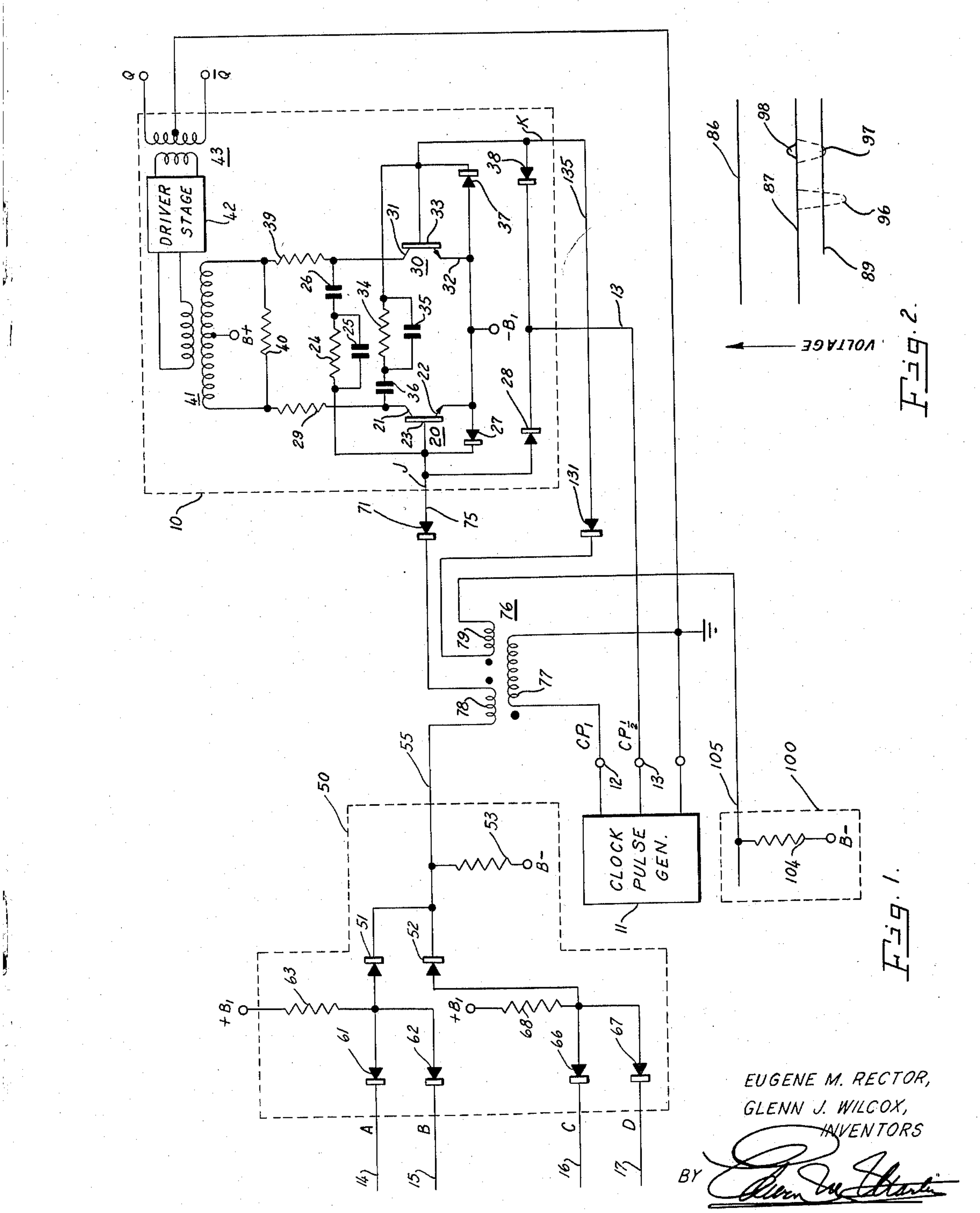

The present invention relates to a clock-pulse insertion circuit, and more particularly to a circuit for logically combining a clock pulse with a voltage level control signal for triggering an electronic flip-flop.

It is well known to utilize bivalued electrical signals for controlling the operation of an electronic flip-flop circuit or other bistable device. One conventional technique is to employ a control signal selectively occupying either of two distinct voltage levels, and to periodically sample the voltage level of the control signal in such a way that a trigger pulse is applied to the flip-flop for one value of the control signal but not for the other. Thus, the clock-pulse or sampling signal is combined with the bivalued control signal as an "and" condition. The source of the bivalued control signal is usually a diode gating matrix.

The prior art has provided various types of circuitry for logically combining the clock pulse and the bivalued control signal in accordance with the above-described technique. The difficulty with the circuits of the prior art has been that a large energy drain has been placed upon the clock-pulse generator inasmuch as the clock-pulse energy not only flows into the flip-flop as is desired, but a very substantial part of the energy flows into the gating matrix, which is undesired.

It is, therefore, an object of the invention to provide an improved circuit for logically combining a clock-pulse signal with a bilevel control signal to selectively produce trigger pulses which may then be injected into an electronic flip-flop.

Another object of the invention is to provide a clock-pulse insertion circuit which efficiently transfers energy from a clock pulse generator to a flip-flop which is to be triggered.

According to the present invention there is provided a clock-pulse insertion circuit which operates at a high power transfer efficiency and at a low energy level. In the preferred embodiment of the invention described herein, the clock pulse is inserted by means of a transformer having an output winding serially connected between a source of bilevel control signals and a properly biased unilaterally conductive device, the latter being in turn serially connected to a flip-flop to be controlled.

The novel features which are believed to be characteristic of the invention, both as to its organization and method of operation, together with further objects and advantages thereof, will be better understood from the following description considered in connection with the accompanying drawing in which an embodiment of the invention is illustrated by way of example. It is to be expressely understood, however, that the drawing is for the purpose of illustration and description only, and is not intended as a definition of the limits of the invention.

Fig. 1 is a schematic circuit diagram illustrating, partially in block form, a control signal source together with a flip-flop circuit to be controlled thereby, and a clock-pulse insertion circuit in accordance with the present invention; and Fig. 2 is a graph of voltage waveforms illustrating the operation of the clock-pulse insertion circuit of Fig. 1.

Referring now to Fig. 1 of the drawing there is shown an electronic flip-flop circuit 10 having two separate input leads 75 and 135 to which trigger pulses are selectively applied in accordance with bi-voltage-level control signals developed in gating circuits 50 and 100, respectively. The bilevel control signals generated in the gating circuits are periodically sampled by means of clock pulses developed in a generator 11.

Flip-flop 10 is arranged to be responsive to negative pulses applied to its input leads 75, 135. Negative pulses developed in generator 11 are selectively passed to flip-flop 10 upon the occurrence of the lower of the two possible voltage levels of the associated control signals developed by gating circuits 50 and 100, respectively. A transformer 76 has a primary winding 77 coupled to generator 11, and secondary windings 78 and 79. Winding 78 is interconnected between an output line 55 of gating circuit 50 and the cathode of a crystal diode 71 whose anode is connected to lead 75. Winding 79 is interconnected between an output lead 105 of gating circuit 100 and the cathode of a crystal diode 131 having its anode connected to lead 135. The polarities of the windings of transformer 76 are arranged to insert negative pulses into each of the input circuits of flip-flop 10, for example, upon the occurrence of a clock pulse, winding 78 causes the cathode of diode 71 to become negative with respect to output line 55. It need not be assumed that both input leads 75, 135, are to be pulsed simultaneously since it may be preferred to utilize logical steering signals in gating circuits 5 and 100 in order to preclude such an occurrence.

The characteristics of the clock-pulse insertion circuit will now be described in more detail. For convenience, reference will be made to the circuit combination which includes gating circuit 50, output line 55, transformer winding 78, crystal diode 71, input lead 75, and flip-flop 10. Within gating circuit 50 it is highly important to minimize power consumption, hence the impedance level is relatively high; more specifically, the output impedance measured with respect to output line 55 is at least a thousand ohms. The clock-pulse generator, on the other hand, has a high power capacity and manifests substantially zero output impedance as measured across winding 78. Crystal diode 71 has a very high back resistance but when forward-biased in its conductive state has an impedance of the order of 200 ohms. The input impedance of flip-flop 10 to a pulse applied on lead 75 is likewise of the order of 200 ohms.

Reference is now made to Fig. 2 in order to explain the operation of the clock-pulse insertion circuit. The upper and lower voltage levels of the control signal appearing on output line 55 are indicated in Fig. 2 by solid lines 86 and 87, respectively. The normal bias level of input lead 75 is indicated by a solid line 89, and it will be noted that this bias is negative with respect to the lower voltage level of the control signal. Bias level 89 must be negative with respect to level 87 by at least the amount of anticipated noise voltage, in order to prevent false triggering. Thus, diode 71 is normally back-biased and therefore nonconductive in the presence of either voltage level of the control signal. The amplitude or envelope of a clock pulse is indicated in Fig. 2 by means of dotted line 96, it being indicated in the illustration that the super-position of the clock pulse upon the lower voltage level of the control signal would be more than adequate to overcome the back-bias of diode 71. In actual operation, however, the potential of the cathode of diode 71 follows the approximate path shown by dotted line 97. When diode 71 becomes forward-biased current flows creating a clamping action insofar as the cathode is concerned, the excess amplitude of the clock pulse voltage being absorbed by the internal impedance of gating circuit 50 and appearing as a positive pulse on output line 55. This positive pulse is designated in Fig. 2 by reference numeral 98. From the foregoing description it is apparent that if the clock pulse amplitude is limited to the minimum amount necessary to trigger the flip-flop, substantially no change would occur in the potential on output line 55 and therefore substantially no energy would be supplied from the clock pulse generator to gating matrix 50. As a matter of engineering practice, however, it is preferred to provide excess amplitude of the clock pulse in order to insure reliability of operation. In order to prevent false triggering the clock pulse amplitude must not exceed the difference between levels 86 and 87.

Having thus outlined the significant features of the structure and operation of the clock-pulse insertion circuit provided by the present invention, reference is again made to Fig. 1 in order to complete the detailed description of the preferred embodiment of the invention.

Gating matrix 50 receives logical signals A and B on input leads 14 and 15, respectively. Lead 14 is connected to the cathode of a diode 61 and lead 15 to the cathode of a diode 62, the anodes of these two diodes being connected through a resistor 63 to a fixed source of bias potential schematically represented by terminal $+B_1$. Logical signals C and D are applied via input lines 16 and 17 to the cathodes of diodes 66 and 67, respectively, the anodes of these diodes being connected through a resistor 68 to terminal $+B_1$. At a second stage level of gating, diodes 51 and 52 have their anodes connected to those of diodes 61 and 66, respectively, their cathodes being connected to output line 55 and also through a resistor 53 to a second source of bias potential represented by a terminal B—.

Gating matrix 100 is not illustrated in detail, but is shown to include a resistor 104 connected between output line 105 and terminal B—. It will be noted that if flip-flop 10 were responsive to positive triggering pulses, then the polarities of diodes 71 and 131 would have to be reversed, the polarity of the clock pulse would have to be reversed, as by reversing the polarities of windings 78 and 79, and the last gating stage within each of the gating matrices 50 and 100 would be biased with a positive source of potential rather than a negative source as illustrated.

Flip-flop 10 as illustrated in a dynamic device which must be systematically trigged at the middle of each clock period and selectively triggered at the ends of the clock period. Thus, generator 11 supplies a periodically recurring pulse $CP_{1/2}$ via lead 13 to flip-flop 10 for reversing the state of flip-flop 10 upon each occurrence of the pulse. Generator 11 also supplies a pulse $CP_1$ via lead 12 to transformer 76 in order to selectively trigger the flip-flop as previously described. Pulse $CP_1$ occurs intermediate to the occurrence of adjacent pulses $CP_{1/2}$ and as a matter of definition it is convenient to say that $CP_{1/2}$ occurs at the middle of each time period and $CP_1$ at the end of each time period.

Flip-flop 10 is fully described in copending application Serial Number 547,830 for "Logical Decision Circuitry for Digital Computation" by Daniel L. Curtis, filed November 18, 1955, and assigned to the assignee of the present application. A brief summary of the characteristics of flip-flop 10 is included herein for convenience, however, in the following paragraphs.

Flip-flop 10 includes a pair of transistors 20 and 30 illustrated as being of the N-P-N junction type as indicated by the conventional schematic symbol. Transistor 20 has a collector 21, an emitter 22, and a base 23; and transistor 30 has a collector 31, an emitter 32, and a base 33; both of the emitters 22, 32 being connected to a negative power supply terminal $-B_1$. A first cross-coupling network includes a resistor 24 and a capacitor 25 connected in parallel, one end of the combination being connected to base 23, the other end being connected through a capacitor 26 to collector 31. In this cross-coupling network the series capacitor 26 functions as a blocking capacitor and has a much larger capacitance than the shunt capacitor 25, in order to provide a substantially constant current characteristic. A second cross-coupling network includes a resistor 34 and a capacitor 35 connected in parallel, the combination being connected to base 33, and connected serially through a capacitor 36 to collector 21. A similar selection of values is made in the second cross-coupling network.

The transistors are energized from a source of positive voltage through a terminal B+ connected to a center tap of the primary winding of a transformer 41, one end of the primary winding being connected through a resistor 29 to collector 21 and the other end through a resistor 39 to collector 31. A resistor 40 is connected across the primary winding of the transformer 41 in order to prevent ringing, or undesired oscillations. A semiconductor diode 27 has its cathode connected to base 23 and its anode to terminal $-B_1$, while another diode 37 has its cathode connected to base 33 and its anode to $-B_1$.

Thus, there is provided a bistable circuit, energized by a source of power connected between terminals B and $-B_1$. The circuit has one condition of stability corresponding to transistor 20 being "on" and transistor 30 being "off," and another condition of stability corresponding to the opposite situation when transistor 30 conducts and transistor 20 does not. Each cross-coupling network provides a substantially constant current which flows in one direction when its associated transistor is conducting and in the opposite direction when its transistor is cut off.

When transistor 20 conducts, current in the conventional sense flows from B+ through resistor 29, collector 21, emitter 22 and thence to $-B_1$, thus biasing collector 21 at a relatively low voltage level. Meanwhile, transistor 30 is nonconducting and collector 31 is biased at a high level. Current therefore flows out of capacitor 26 through resistor 24, base 23, and emitter 22 to $-B_1$, thus biasing base 23 a fraction of a volt positive with respect to emitter 22 and back-biasing diode 27 to the same extent.

When transistor 30 conducts, collector 21 is biased at a high level, current flows through resistor 24 to recharge capacitor 26, hence this current flows from $-B_1$ through diode 27 to resistor 24. Diode 27 is then biased in the forward direction by a fraction of a volt, and the base-to-emitter path is back-biased to the same extent. Thus, when transistor 20 is conducting capacitor 36 charges and capacitor 26 discharges, while when transistor 30 is conducting the opposite situation exists.

Flip-flop 10 also includes a driver stage 42 which is coupled to the secondary winding of transformer 41, and an output transformer 43 which is coupled to the output of the driver stage. Driver stage 42 may, for example, include a pair of transistors connected essentially in push-pull. The secondary winding of output transformer 43 is provided with a center-tap which is connected to ground.

When transistor 20 is conducting, current in the conventional sense flows out of capacitor 26 through resistor 24, into base 23 and thence through emitter 22 to the biasing source $-B_1$. The application of a negative clock pulse $CP_1$ to base 23 causes conventional current to flow through diode 71 to the B— source, and at the same time interrupts the base-to-emitter current in transistor 20. The flip-flop therefor assumes its opposite state.

In actual operation it has been found satisfactory to provide approximately a two-volt swing of the control signal between its upper and lower voltage levels, and to provide a clock-pulse amplitude of approximately two volts. Thus, the upper level of control signal indicated by line 86 of Fig. 2 might be +1 volt, while the lower level indicated as line 87 might be −1 volt. The potential of source $-B_1$ in flip-flop 10 may be fixed at −1.5 volts in order to provide an adequate holding bias for diodes 71, 131.

What is claimed is:

1. A network including a controllable bistable element having at least a single input circuit, "logical" gating means for coupling binary signals into said input circuit, transformer means connected intermediate said gating means and said bistable element for superimposing clock pulses on to the binary signals, and clock pulse generating means coupled to said transformer means for energizing same.

2. A network including a bistable element, "logical" gating means for coupling binary signals to said bistable element, said gating means being arranged to provide binary signals proportioned below the level required to cause said bistable element to change state, transformer means having a primary winding and a secondary winding, said secondary winding being arranged intermediate said gating means and said bistable element for serially combining a clock signal with the binary signal from said gating means whereby the thus combined signals cause said bistable element to change state, and clock signal generating means coupled to energize said primary winding of said transformer means.

3. A "logical" network for controlling a bistable element comprising a bistable device having at least a single input circuit, asymmetrically conducting means connected in series circuit relationship with said single input circuit and arranged to be normally non-conductive, gating means for coupling binary signals to said asymmetrically conducting means, transformer means connected in series circuit relationship with said gating means and said asymmetrically conducting means for injecting a signal in combination with the received binary signals and which combination is effective to cause said asymmetrically conducting means to conduct and to thereby cause said bistable element to change state, and means for delivering signals to said transformer means.

References Cited in the file of this patent

UNITED STATES PATENTS

| | | |
|---|---|---|
| 2,622,212 | Anderson et al. | Dec. 16, 1952 |
| 2,673,936 | Harris | Mar. 30, 1954 |
| 2,706,811 | Steele | Apr. 19, 1955 |
| 2,762,936 | Forrest | Sept. 11, 1956 |
| 2,763,851 | Haynes | Sept. 18, 1956 |

UNITED STATES PATENT OFFICE
CERTIFICATE OF CORRECTION

Patent No. 2,918,587

December 22, 1959

Eugene M. Rector et al.

It is hereby certified that error appears in the printed specification of the above numbered patent requiring correction and that the said Letters Patent should read as corrected below.

Column 2, line 34, for "circuits 5" read -- circuits 50 --; column 3, line 50, for "illustrated in a" read -- illustrated is a --; column 4, line 40, for "thence" read -- hence --.

Signed and sealed this 14th day of June 1960.

(SEAL)
Attest:

KARL H. AXLINE

Attesting Officer

ROBERT C. WATSON
Commissioner of Patents